(12) United States Patent
Demo et al.

(10) Patent No.: US 9,747,883 B2
(45) Date of Patent: Aug. 29, 2017

(54) ACOUSTIC INSULATOR MAT WITH LIQUID APPLIED SPRAYABLE COATING AND METHOD FOR MAKING THE SAME

(71) Applicant: Cadillac Products Automotive Company, Troy, MI (US)

(72) Inventors: Michael Demo, Macomb, MI (US); Kenneth Ritzema, Clarkston, MI (US)

(73) Assignee: Cadillac Products Automotive Company, Troy, MI (US)

(*) Notice: Subject to any disclaimer, the term of this patent is extended or adjusted under 35 U.S.C. 154(b) by 0 days.

(21) Appl. No.: 15/096,332

(22) Filed: Apr. 12, 2016

(65) Prior Publication Data

US 2016/0307555 A1    Oct. 20, 2016

Related U.S. Application Data

(60) Provisional application No. 62/147,066, filed on Apr. 14, 2015.

(51) Int. Cl.

| | | |
|---|---|---|
| *B60R 13/08* | (2006.01) | |
| *G10K 11/162* | (2006.01) | |
| *B05D 1/02* | (2006.01) | |
| *B05D 3/02* | (2006.01) | |
| *D04H 1/42* | (2012.01) | |

(Continued)

(52) U.S. Cl.
CPC .............. *G10K 11/162* (2013.01); *B05D 1/02* (2013.01); *B05D 3/0254* (2013.01); *B60R 13/08* (2013.01); *B60R 13/083* (2013.01); *B60R 13/0815* (2013.01); *D04H 1/42* (2013.01); *D04H 1/4274* (2013.01); *D04H 1/559* (2013.01);

(Continued)

(58) Field of Classification Search
CPC .... B60R 13/08; B60R 13/0815; B60R 13/083
USPC ................................. 181/290, 291, 293, 294
See application file for complete search history.

(56) References Cited

U.S. PATENT DOCUMENTS

| | | |
|---|---|---|
| 4,152,474 A | 5/1979 | Cook et al. |
| 4,655,496 A | 4/1987 | Gahlau et al. |

(Continued)

OTHER PUBLICATIONS

International Search Report for Application No. PCT/US2016/027302 dated Jul. 22, 2016.

(Continued)

*Primary Examiner* — Jeremy Luks
(74) *Attorney, Agent, or Firm* — Harness, Dickey & Pierce, P.L.C.

(57) ABSTRACT

The disclosed acoustic insulator mat includes a first absorber layer made of a non-woven fibrous material. The non-woven fibrous material comprises a mesh of intertwined fibers that defines a plurality of cavities. The first absorber layer has a first side and a second side. Peripheral cavities are arranged along the second side of the first absorber layer between peripheral fibers. A coating is disposed on the second side of the first absorber layer. The coating is adhered to the peripheral fibers and thus includes a plurality of discontinuities at the peripheral cavities such that the coating provides a partial barrier to noise at the second side of the first absorber layer. The acoustic insulator mat may optionally include a second absorber layer that is retained on the first absorber layer by the coating. A method of manufacturing the acoustic insulator mat is also disclosed.

15 Claims, 14 Drawing Sheets

(51) Int. Cl.
    *D04H 1/559* (2012.01)
    *D04H 1/593* (2012.01)
    *G10K 11/168* (2006.01)
    *D04H 1/4274* (2012.01)
    *D04H 1/64* (2012.01)

(52) U.S. Cl.
    CPC .............. *D04H 1/593* (2013.01); *D04H 1/64* (2013.01); *G10K 11/168* (2013.01)

(56) References Cited

U.S. PATENT DOCUMENTS

| | | | |
|---|---|---|---|
| 6,109,389 A * | 8/2000 | Hiers | B60R 13/08 181/286 |
| 6,284,351 B1 | 9/2001 | Sensenig | |
| 6,617,002 B2 | 9/2003 | Wood | |
| 7,070,848 B2 * | 7/2006 | Campbell | B60R 13/083 181/284 |
| 7,402,537 B1 | 7/2008 | Lenda et al. | |
| 7,837,009 B2 | 11/2010 | Gross et al. | |
| 7,878,301 B2 | 2/2011 | Gross et al. | |
| 7,918,313 B2 | 4/2011 | Gross et al. | |
| 2002/0117352 A1 * | 8/2002 | Veen | G10K 11/162 181/292 |
| 2005/0126848 A1 * | 6/2005 | Siavoshai | B60R 13/0815 181/207 |
| 2007/0082172 A1 | 4/2007 | Derbyshire et al. | |
| 2007/0137926 A1 * | 6/2007 | Albin, Jr. | B60R 13/0815 181/290 |
| 2010/0003466 A1 | 1/2010 | Hessler | |
| 2014/0265413 A1 * | 9/2014 | Demo | B60R 13/0815 296/39.3 |
| 2015/0232044 A1 * | 8/2015 | Demo | B60R 13/08 181/290 |

OTHER PUBLICATIONS

Written Opinion of the International Searching Authority for Application No. PCT/US2016/027302 dated Jul. 22, 2016.

* cited by examiner

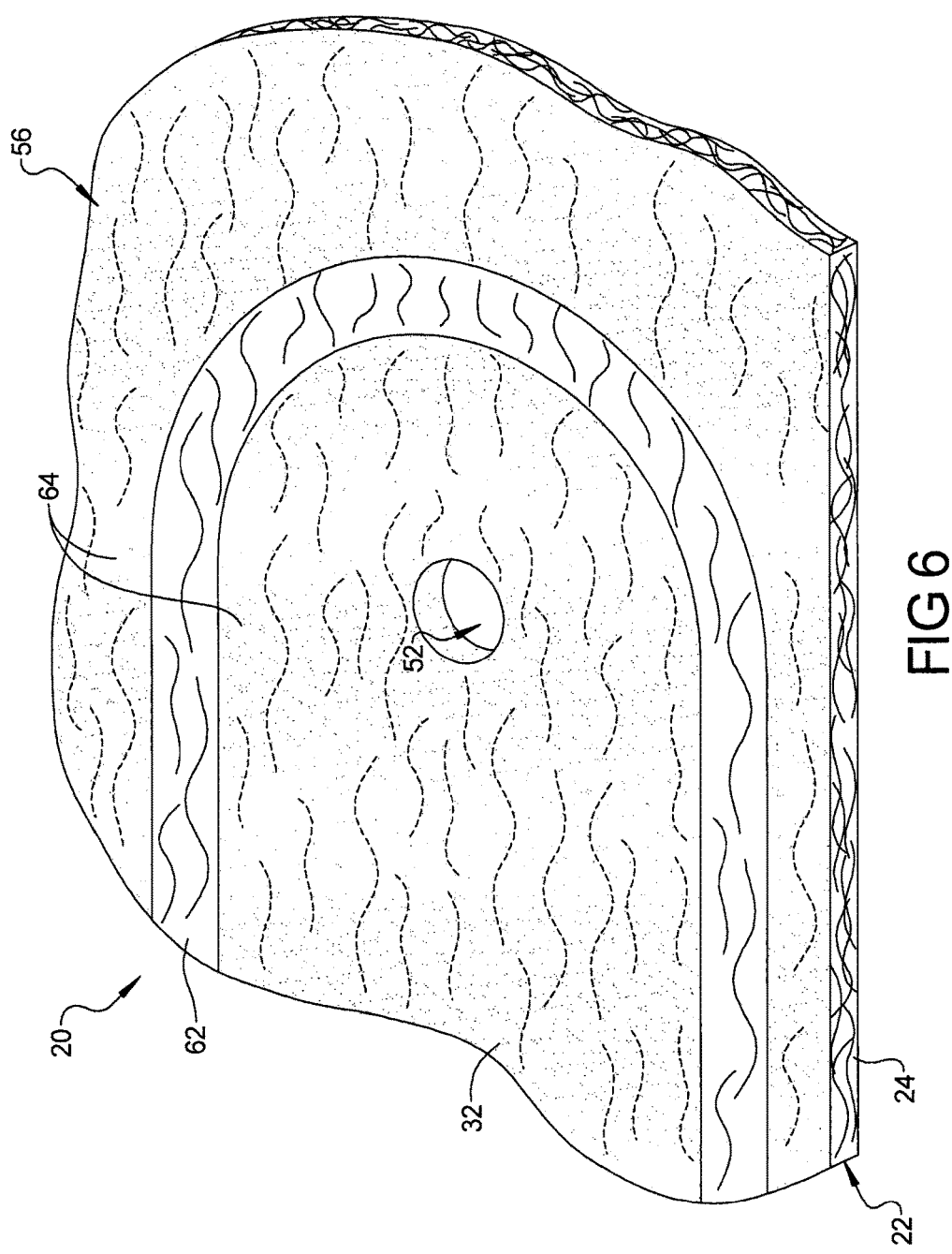

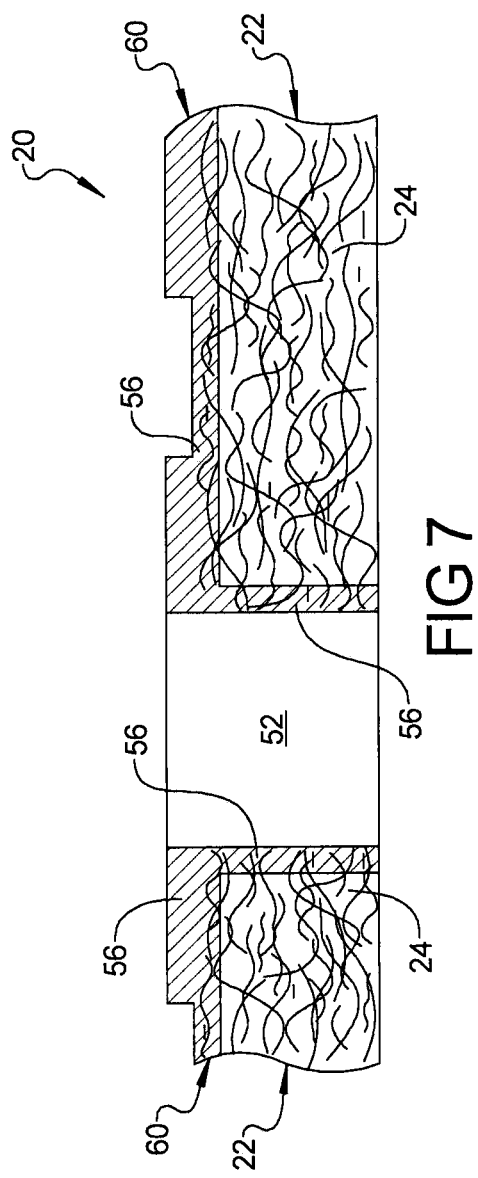
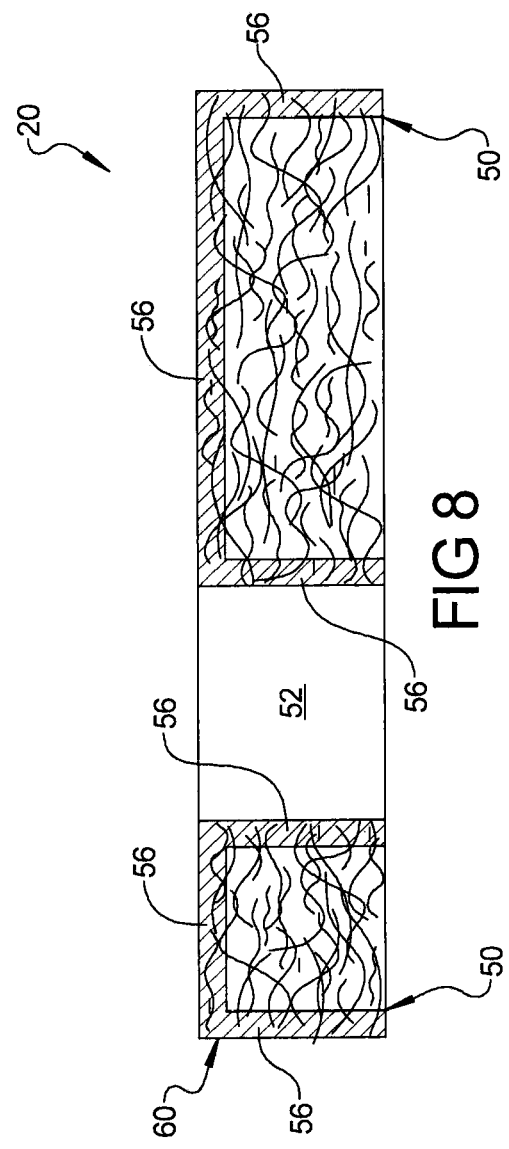

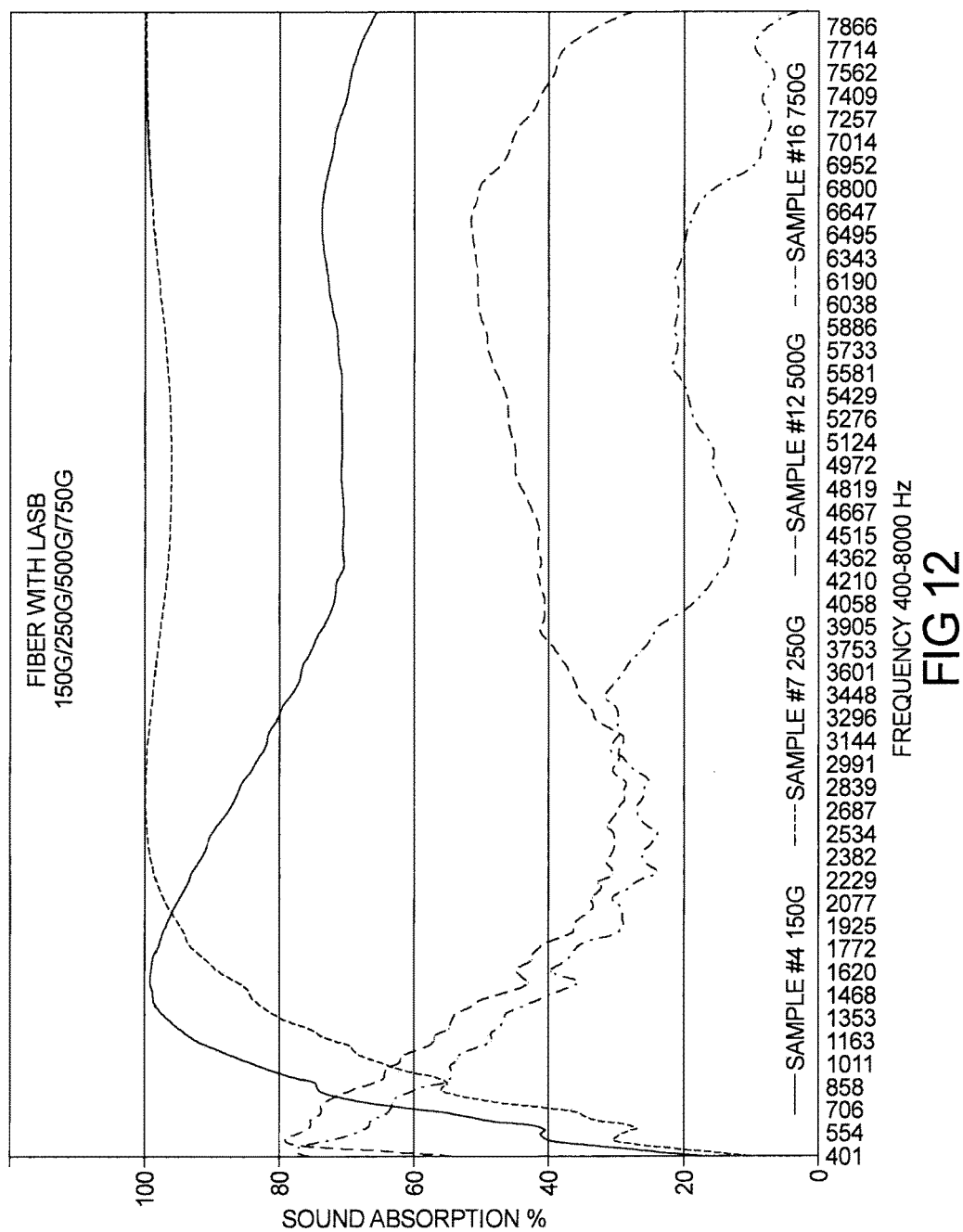

```
┌─────────────────────────────────────────────────────────────────────────┐
│ MAKING A FIRST ABSORBER LAYER OUT OF A NON-WOVEN FIBROUS MATERIAL AND A │
│    BINDER BY-COMPONENT TO FORM A SHEET HAVING A FIRST SIDE AND A SECOND │
│                SIDE THAT ARE SPACED BY A FIRST THICKNESS                │
│                                  100                                    │
└─────────────────────────────────────────────────────────────────────────┘
                                    ↓
┌─────────────────────────────────────────────────────────────────────────┐
│    COMPRESSING THE FIRST ABSORBER LAYER TO A SECOND THICKNESS THAT IS   │
│     SMALLER THAN THE FIRST THICKNESS BY FEEDING THE SHEET FORMING THE   │
│            FIRST ABSORBER LAYER THROUGH A PAIR OF ROLLERS               │
│                                  102                                    │
└─────────────────────────────────────────────────────────────────────────┘
                                    ↓
┌─────────────────────────────────────────────────────────────────────────┐
│   HEATING THE FIRST ABSORBER LAYER TO ACTIVATE THE BINDER BY-COMPONENT  │
│     AND FLATTEN AT LEAST THE SECOND SIDE OF THE FIRST ABSORBER LAYER    │
│                                  104                                    │
└─────────────────────────────────────────────────────────────────────────┘
                                    ↓
┌─────────────────────────────────────────────────────────────────────────┐
│ MOLDING THE SHEET FORMING THE FIRST ABSORBER LAYER INTO A PRE-DETERMINED│
│       SHAPE THAT IS CONTOURED AND THAT HAS A VARIABLE THICKNESS         │
│                                  106                                    │
└─────────────────────────────────────────────────────────────────────────┘
                                    ↓
┌─────────────────────────────────────────────────────────────────────────┐
│    CUTTING THE FIRST ABSORBER LAYER TO CREATE AT LEAST ONE PASS-THROUGH │
│           THAT EXTENDS ENTIRELY THROUGH THE FIRST ABSORBER LAYER        │
│                                  108                                    │
└─────────────────────────────────────────────────────────────────────────┘
                                    ↓
┌─────────────────────────────────────────────────────────────────────────┐
│   SPRAYING A MIXTURE OF WATER, CALCIUM CARBONATE, AND POLYMER ONTO THE  │
│   SECOND SIDE OF THE FIRST ABSORBER LAYER TO COAT THE SECOND SIDE OF THE│
│      FIRST ABSORBER LAYER AND CREATE A PARTIAL NOISE BARRIER THAT HAS A │
│         PLURALITY OF DISCONTINUITIES THAT PERMIT THE PASSAGE OF SOUND   │
│                                  110                                    │
└─────────────────────────────────────────────────────────────────────────┘
                                    ↓
┌─────────────────────────────────────────────────────────────────────────┐
│  RE-HEATING THE FIRST ABSORBER LAYER TO FLASH OFF THE WATER IN THE MIXTURE│
│                  AND CURE THE PARTIAL NOISE BARRIER                     │
│                                  112                                    │
└─────────────────────────────────────────────────────────────────────────┘
                                    ↓
┌─────────────────────────────────────────────────────────────────────────┐
│  MAKING A SECOND ABSORBER LAYER OUT OF A NON-WOVEN FIBROUS MATERIAL AND │
│                        A BINDER BY-COMPONENT                            │
│                                  114                                    │
└─────────────────────────────────────────────────────────────────────────┘
                                    ↓
┌─────────────────────────────────────────────────────────────────────────┐
│   PRESSING THE SECOND ABSORBER LAYER AGAINST THE PARTIAL NOISE BARRIER TO│
│      ADHERE THE SECOND ABSORBER LAYER TO THE FIRST ABSORBER LAYER       │
│                                  116                                    │
└─────────────────────────────────────────────────────────────────────────┘
                                    ↓
┌─────────────────────────────────────────────────────────────────────────┐
│   TRIMMING OFF ANY EXCESS FROM THE FIRST ABSORBER LAYER AND THE SECOND  │
│  ABSORBER LAYER THAT DOES NOT OVERLAP WITH THE PARTIAL NOISE BARRIER TO │
│    PRODUCE OFFAL THAT IS FREE OF THE MIXTURE OF WATER, CALCIUM CARBONATE,│
│                              AND POLYMER                                │
│                                  118                                    │
└─────────────────────────────────────────────────────────────────────────┘
                                    ↓
┌─────────────────────────────────────────────────────────────────────────┐
│      RECYCLING THE OFFAL TO MAKE AT LEAST ONE OF THE FIRST ABSORBER     │
│                   LAYER AND THE SECOND ABSORBER LAYER                   │
│                                  120                                    │
└─────────────────────────────────────────────────────────────────────────┘
```

FIG 13

ACOUSTIC INSULATOR MAT WITH LIQUID APPLIED SPRAYABLE COATING AND METHOD FOR MAKING THE SAME

CROSS-REFERENCE TO RELATED APPLICATIONS

This application claims the benefit of U.S. Provisional Application No. 62/147,066, filed on Apr. 14, 2015. The entire disclosure of the application referenced above is incorporated herein by reference.

FIELD

The subject disclosure generally relates to acoustic insulator mats and methods of manufacturing the same.

BACKGROUND

This section provides background information related to the present disclosure, which is not necessarily prior art.

Acoustic insulator mats of the type described herein are commonly used in automobiles and other vehicles to reduce the amount of noise experienced by occupants. Such acoustic insulator mats, also referred to as noise attenuation systems, are typically made of foam and/or "shoddy" material, built up for lightweight constructions. Shoddy is typically made of cotton or other non-woven fibrous materials that absorbs noise and a non-liquid, binder bi-component that holds the cotton or other non-woven fibrous materials together. Accordingly, acoustic insulator mats are typically molded sheets that can conform to substantially any vehicle component shape.

Vehicle manufacturers often install acoustic insulator mats in multiple locations inside and outside a passenger compartment of a vehicle. Because acoustic insulator mats are flexible, they are typically retained and supported on a wall of the vehicle at multiple locations. One such acoustic insulator mat is disclosed by Gahlau et al. in U.S. Pat. No. 4,655,496 entitled "Motor Vehicle Noise Insulation." As shown in this reference, such acoustic insulator mats are often applied in a blanket form to cover the walls of a vehicle such as the engine firewall and transmission tunnel in order to attenuate engine noise and road noise in the passenger compartment of the vehicle. This reference also shows that typical acoustic insulator mats often require pass-through openings that accommodate various penetrating members, such as a steering column, brake and accelerator linkages, shift linkages, electrical wiring, and ducting.

The location of acoustic insulator mats within the vehicle and the material that is used for these acoustic insulator mats typically varies between two different schools of thought. Some vehicle manufacturers add acoustic insulator mats to vehicles to reduce the amount of sound that enters the passenger compartment. Such acoustic insulator mats typically include sound barrier films attached to shoddy layers. Such sound barrier films exhibit high transmission loss and reflect noise away from the passenger compartment (i.e. sound barrier films block a large amount of incoming noise and prevent this incoming noise from entering the passenger compartment). By way of example, sound barrier films may be made from sheets of polypropylene, polyvinylchloride, polyethylene, ethylene vinyl acetate, or other thermoplastic materials. One problem with this approach is that the entire passenger compartment cannot be sealed/shielded by acoustic insulator mats and therefore sound will inevitably enter the passenger compartment. For example, sound typically enters the passenger compartment through the vehicle's windows, regardless of whether the windows are open or closed. Because sound barrier films are designed to reflect sound, acoustic insulator mats with sound barrier films typically do not absorb sound well. Any noise that does make its way into the passenger compartment is typically reflected back and forth in the passenger compartment by the sound barrier film and is not attenuated or absorbed by the acoustic insulator mat.

Other vehicle manufacturers add acoustic insulator mats to vehicles to absorb noise within the passenger compartment. Such acoustic insulator mats are made entirely of highly sound absorbent materials such as shoddy. The ability of such acoustic insulator mats to absorb and dissipate noise contained within the passenger compartment typically increases with mat thickness. Accordingly, a disadvantage of this approach is that well performing acoustic insulator mats add significant weight to the vehicle, which negatively impacts the performance and fuel economy of the vehicle. Another disadvantage with this approach is that highly sound absorbent materials also typically have low transmission loss. Therefore, little sound is prevented from entering the passenger compartment by the acoustic insulator mat so there is more noise in the passenger compartment that requires attenuation. Therefore, a need exists for an acoustic insulator mat that blends these two approaches, which traditionally have been viewed as mutually exclusive due to material limitations.

SUMMARY

This section provides a general summary of the disclosure and is not a comprehensive disclosure of its full scope or all of its features.

The disclosed acoustic insulator mat includes a first absorber layer that is made of a non-woven fibrous shoddy material. The non-woven fibrous shoddy material comprises a mesh of intertwined fibers that defines a plurality of cavities within the first absorber layer. The first absorber layer has a first side and a second side. The mesh of intertwined fibers includes peripheral fibers that are arranged along at least the second side of the first absorber layer. Similarly, the plurality of cavities in the first absorber layer includes peripheral cavities that are arranged along at least the second side of the first absorber layer between the peripheral fibers. The peripheral cavities are open to the second side of the first absorber layer. The acoustic insulator mat includes a coating disposed on the second side of the first absorber layer that is adhered to the peripheral fibers of the first absorber layer. The coating includes a plurality of discontinuities at the peripheral cavities such that the coating provides a partial barrier to noise at the second side of the first absorber layer.

A method of manufacturing the disclosed acoustic insulator mat is also provided. The method includes the step of making a first absorber layer out of a non-woven fibrous material. In accordance with this step of the method, the first absorber layer forms a sheet having a first side and a second side. The method also includes the step of molding the sheet forming the first absorber layer into a pre-determined shape that is contoured (i.e. non-planar). The method further includes the step of spraying a predetermined mixture of water, calcium carbonate, and polymer onto the second side of the first absorber layer to coat the second side of the first absorber layer and create a partial barrier to noise (i.e. a partial noise barrier) at the second side of the first absorber layer. In accordance with the method, the partial noise barrier created by the spraying step has a plurality of discontinuities that permit the partial passage of sound. The spraying step is performed after the molding step to create a finished part.

Advantageously, the disclosed acoustic insulator mat blocks more noise than un-coated shoddy mats and has improved sound absorption in comparison to shoddy mats that include sound barrier films. When utilized to reduce noise in the passenger compartment of a vehicle, the partial noise barrier that is formed by the coating reduces the amount of sound that can travel from the wall of the vehicle, through the acoustic insulator mat, and into the passenger compartment. At the same time, the plurality of discontinuities in the coating allow for sound to pass from the passenger compartment, through the partial noise barrier formed by the coating, and into the first absorber layer where it is absorbed and/or attenuated. In this way, the disclosed acoustic insulator mat reduces the amount of sound that enters passenger compartment and helps to quiet noise that is in the passenger compartment. Further, because the plurality of discontinuities in the coating allow for a limited amount of sound to travel from the wall of the vehicle, through the acoustic insulator mat, and into the passenger compartment, the effects of resonance are reduced. Since a limited amount of sound can escape through the partial noise barrier formed by the coating, sound is not trapped between the wall of the vehicle and the coating and is therefore less prone to resonating between the wall of the vehicle and the coating.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 6 is a partial, front perspective view of another exemplary acoustic insulator mat constructed in accordance with the subject disclosure where the coating covers only part of one side of the first absorber layer leaving un-coated areas of the first absorber layer;

FIG. 7 is a partial cross-sectional view of another exemplary acoustic insulator mat where the coating that is applied to the first absorber layer has a variable thickness and also extends into the pass-through opening in the first absorber layer;

FIG. 8 is a partial cross-sectional view of another exemplary acoustic insulator mat where the coating that is applied to the first absorber layer also extends along a perimeter edge of the first absorber layer and into the pass-through opening in the first absorber layer;

FIG. 12 is a plot of sound absorption percentage versus frequency that compares the acoustic absorption performance of four different samples of the disclosed acoustic insulator mat at various coating weights;

FIG. 13 is a flow chart illustrating the steps of an exemplary method of manufacturing the disclosed acoustic insulator mat;

DETAILED DESCRIPTION

Figure 1:
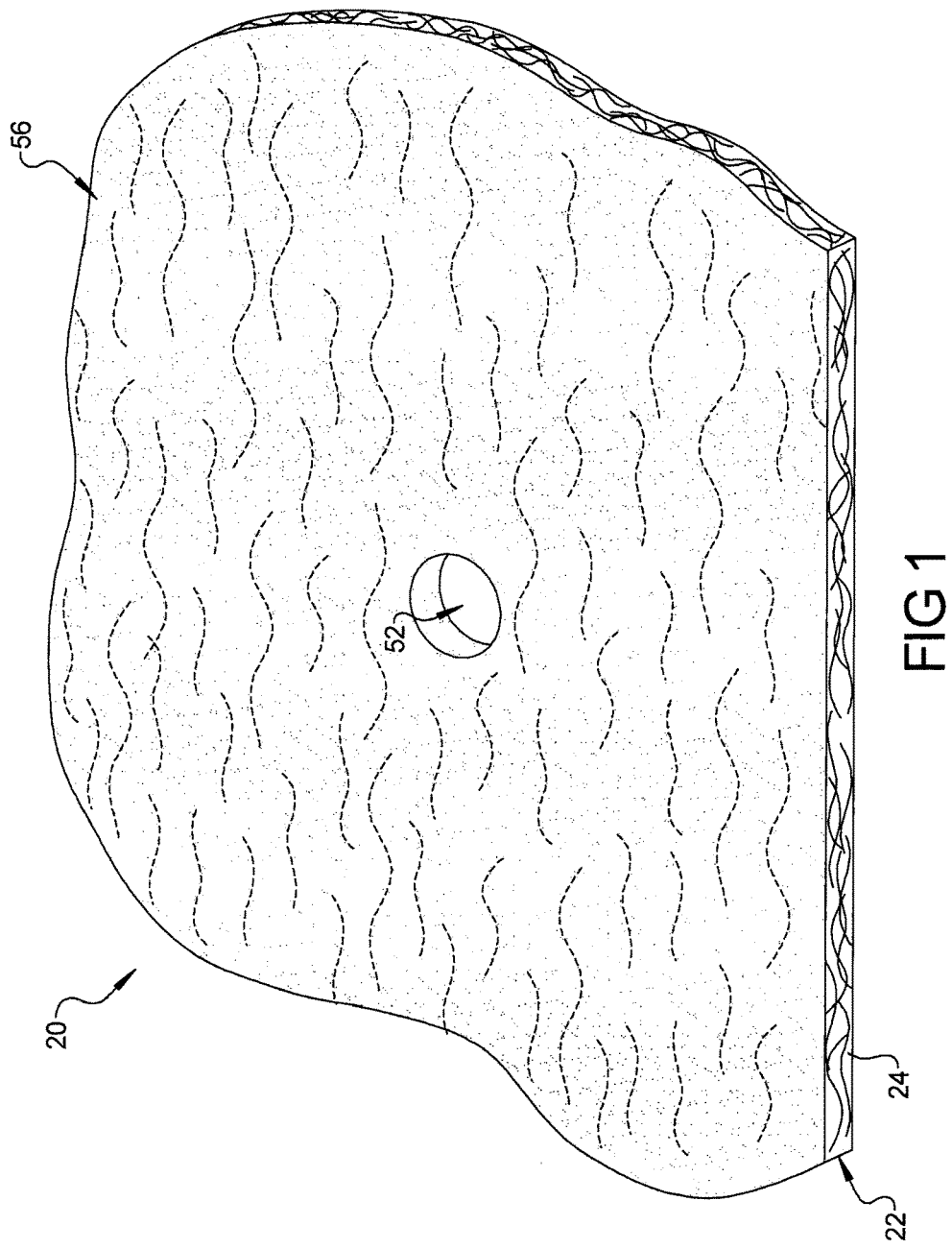
FIG. 1 is a partial, front perspective view of an exemplary acoustic insulator mat constructed in accordance with the subject disclosure where the acoustic insulator mat includes a first absorber layer and a coating that has been applied to one side of the first absorber layer and along a pass-through opening in the first absorber layer.

Referring to the Figures, wherein like numerals indicate corresponding parts throughout the several views, an acoustic insulator mat 20 is disclosed.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," "containing," and "having," are inclusive and therefore specify the presence of stated features, integers, steps, operations, elements, and/or components, but do not preclude the presence or addition of one or more other features, integers, steps, operations, elements, components, and/or groups thereof. The terms "sound," "acoustic," and "noise" are used interchangeably herein. Further, the terms "partial barrier to noise" and "partial noise barrier" are used interchangeably herein. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
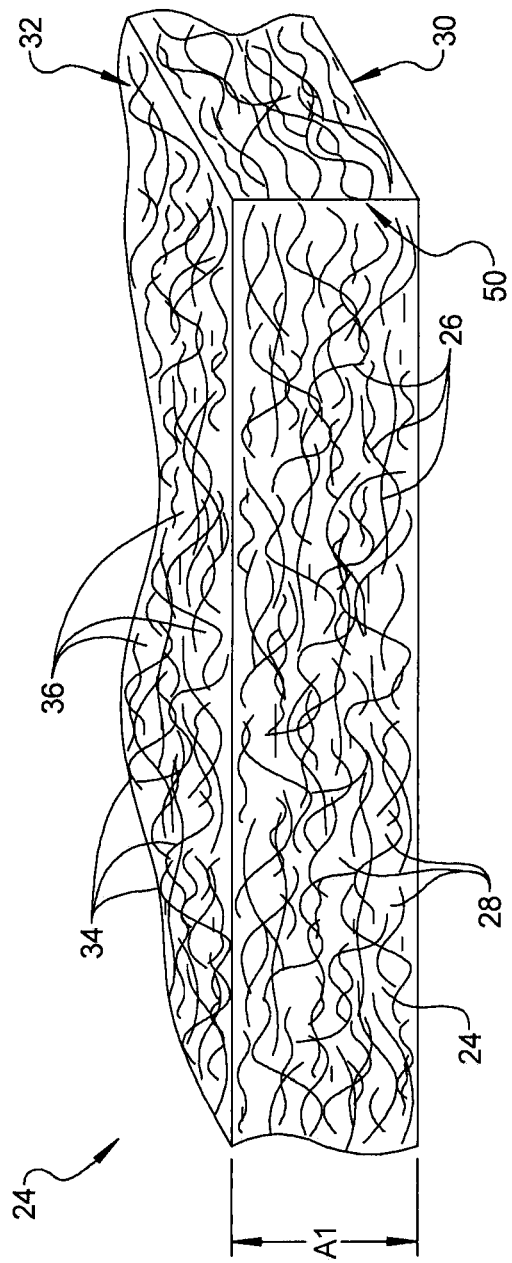
FIG. 2 is an enlarged, front perspective view of the first absorber layer of the acoustic insulator mat illustrated in FIG. 1.

With reference to FIG. 1, the disclosed acoustic insulator mat 20 includes a first absorber layer 22 that is made of a non-woven fibrous material 24. The non-woven fibrous material 24 is made of a sound absorbent material such that the first absorber layer 22 absorbs noise. By way of example and without limitation, the non-woven fibrous material 24 may include polyester fiber, cotton, fiberglass, foam, microfibers, micro denier rider, polypropylene (PP), polyethylene terephthalate (PET), and/or a combination of these materials. Accordingly, the non-woven fibrous material 24 may be classified as "shoddy", which typically includes synthetic material, natural material, virgin material, recycled material, post-industrial material, post-consumer material, or any combination thereof. As best seen in FIG. 2, which is an enlarged perspective view of the first absorber layer 22, the non-woven fibrous material 24 comprises a mesh of intertwined fibers 26 that are randomly arranged. The first absorber layer 22 may also contain a binder bi-component that holds the mesh of intertwined fibers 26 in the non-woven fibrous material 24 together. By way of example and without limitation, the binder bi-component may be thermoplastic fibers or thermoset resin powder. The mesh of intertwined fibers 26 defines a plurality of random cavities 28 within the first absorber layer 22 that are interconnected with one another to provide a breathable material that air and sound can pass through. The first absorber layer 22 includes a first side 30 and a second side 32. The second side 32 of the first absorber layer 22 is spaced from the first side 30 of the first absorber layer 22 by a first absorber layer thickness A1. The first and second sides 30, 32 of the first absorber layer 22 may generally be arranged parallel with one another; however, as will be explained below, the first absorber layer 22 may be contoured (i.e. non-planar) such that the first and second sides 30, 32 of the first absorber layer 22 may not be parallel with one another in certain configurations or at certain locations along the acoustic insulator mat 20. By way of example and without limitation, the first absorber layer thickness A1 can range from approximately 5 to 50 millimeters (mm), and can vary over the extent of the first absorber layer 22 to accommodate compression due to local space restrictions, such as ventilation system ducting, electrical cableways, and the like. The mesh of intertwined fibers 26 of the first absorber layer 22 includes peripheral fibers 34 that are arranged along the first side 30 and the second side 32 of the first absorber layer 22. As such, the peripheral fibers 34 are exposed at the first and second sides 30, 32 of the first absorber layer 22 before the first absorber layer 22 has been installed or coated in accordance with the disclosure set forth below. Similarly, the plurality of random cavities 28 of the first absorber layer 22 includes peripheral cavities 36 that are arranged along the first and second sides 30, 32 of the first absorber layer 22 between the peripheral fibers 34. The peripheral cavities 36 are open to the first and second sides 30, 32 of the first absorber layer 22. In this way, air and sound generally enters the first absorber layer 22 through the peripheral cavities 36.

Figure 3:
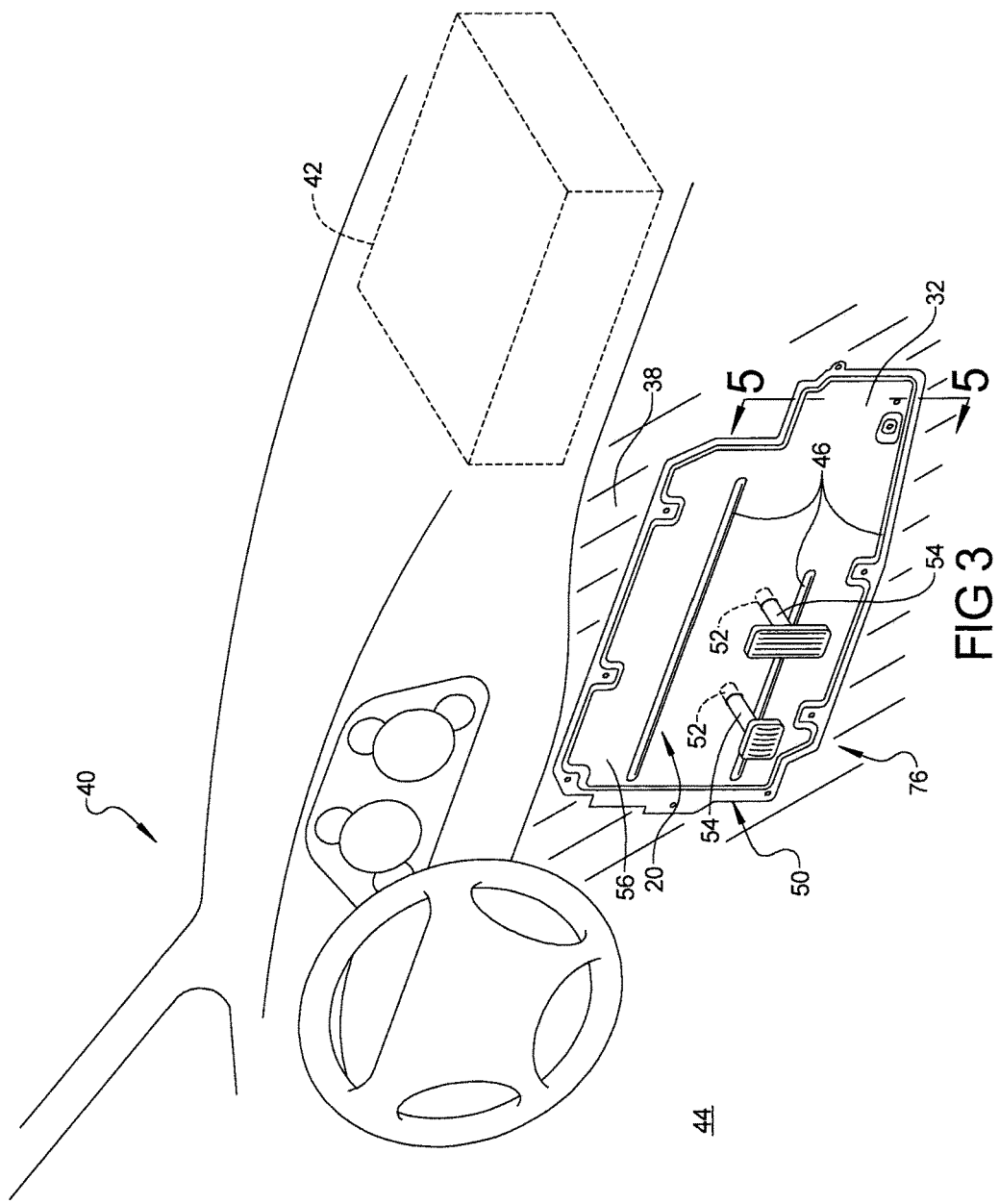
FIG. 3 is a front perspective view of another exemplary acoustic insulator mat constructed in accordance with the subject disclosure where the acoustic insulator mat is contoured and is shown installed on a wall of a vehicle.
Figure 5:
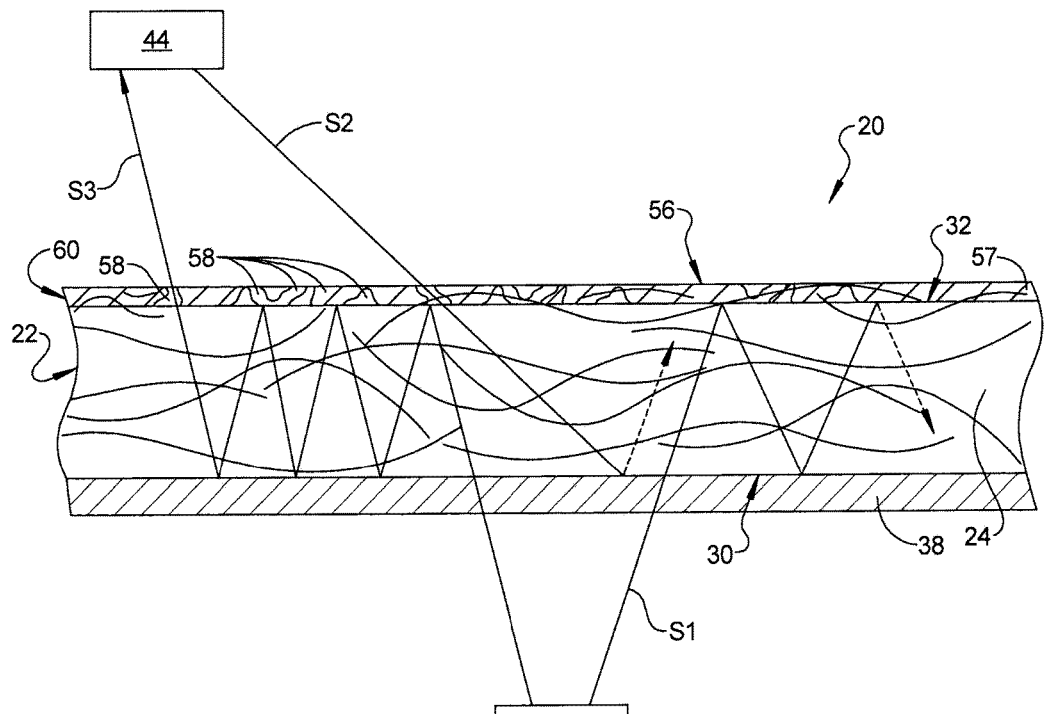
FIG. 5 is a partial cross-sectional view of the acoustic insulator mat illustrated in FIG. 3 showing noise transmission through the wall of the vehicle and the acoustic insulator mat where the cross-sectional view is taken along line 5-5 in FIG. 3.

FIG. 3 illustrates one possible application, where the disclosed acoustic insulator mat 20 is placed or installed along a wall 38 of a vehicle 40 (see FIG. 5). The wall 38 of the vehicle 40 may be, without limitation, a firewall, dashboard, drivetrain tunnel, or wheel well of the vehicle 40 and therefore may have a non-planar shape. When the acoustic insulator mat 20 is installed, the first side 30 of the first absorber layer 22 faces the wall 38 of the vehicle 40 and the second side 32 of the first absorber layer 22 faces away from the wall 38 of the vehicle 40. As such, the first side 30 of the first absorber layer 22 may face a noise source 42 such as an engine or tires while the second side 32 of the first absorber layer 22 may face a passenger compartment 44 of the vehicle 40 (see FIG. 5). Further, the acoustic insulator mat 20 shown in FIG. 3 has several molded-in contours 46 that give the first absorber layer 22 an undulating (i.e. non-planar) shape. The molded-in contours 46 may be disposed on only the second side 32 of the first absorber layer 22, or alternatively, on both the first and second sides 30, 32 of the first absorber layer 22 such that the first side 30 of the first absorber layer 22 closely fits against the non-planar shape of the wall 38. The first absorber layer 22 also includes a perimeter edge 50 that extends between the first side 30 and the second side 32 of the first absorber layer 22 (see also FIG. 2). As shown in FIG. 1, the first absorber layer 22 may additionally include one or more pass-through openings 52 that extend through the non-woven fibrous material 24 of the first absorber layer 22 from the first side 30 to the second side 32. As shown in FIG. 3, the pass-through openings 52 may receive one or more penetrating members 54, which may be various components of the vehicle 40. By way of example and without limitation, the one or more penetrating members 54 may be a steering column, transmission shift lever, transmission shifter linkage, accelerator pedal linkage, brake pedal linkage, clutch pedal linkage, wiring harness, wiring loom, and HVAC ducting.

Figure 4:
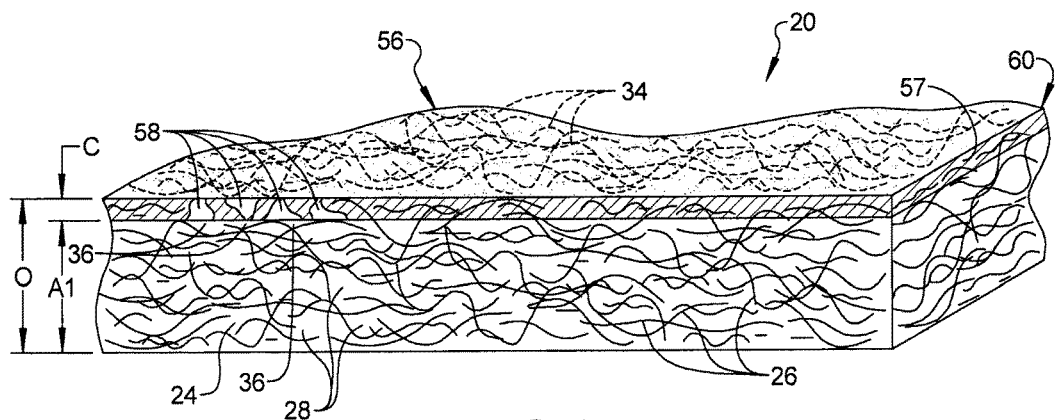
FIG. 4 is an enlarged, front perspective view of the acoustic insulator mat illustrated in FIG. 1 where the coating is shown having a uniform thickness.

With reference to FIGS. 1, 3, and 4, a coating 56 is disposed on the second side 32 of the first absorber layer 22. The coating 56 is adhered to the peripheral fibers 34 on the second side 32 of the first absorber layer 22. As will be explained in further detail below, the coating 56 is applied to the second side 32 of the first absorber layer 22 as liquid spray. The coating 56 coats the peripheral fibers 34 on the second side 32 of the first absorber layer 22, but does not span the spaces between the peripheral fibers 34 like a sound barrier film would. Therefore, the coating 56 does not seal the peripheral cavities 36 on the second side 32 of the first absorber layer 22. In other words, the coating 56 includes a plurality of discontinuities 58 (see FIG. 4) that are formed at the peripheral cavities 36 on the second side 32 of the first absorber layer 22. The plurality of discontinuities 58 in the coating 56 creates a partial noise barrier 60 on the second side 32 of the first absorber layer 22 that allows a limited amount of air and sound to pass through the coating 56. This stands in contrast to sound barrier films, which do not have any discontinuities through which air and sound can pass (with the exception of pass-throughs or perforations created by additional manufacturing operations such as needling). The plurality of discontinuities 58 disposed along the coating 56 are variable in size and have non-uniform geometries. In other words, the size, shape, and spacing between adjacent discontinuities in the plurality of discontinuities 58 are random because the plurality of discontinuities 58 are defined by the peripheral fibers 34 and peripheral cavities 36 on the second side 32 of the first absorber layer 22, which are also arranged at random.

With reference to FIG. 4, the coating 56 of the acoustic insulator mat 20 has a coating weight that generally corresponds to a coating thickness C. As will be explained in greater detail below, the coating 56 may be applied in a single pass or in several passes where the coating thickness C is built up gradually with each pass. By way of example, the coating thickness C may range from 0.1 to 2.0 millimeters (mm). Together, the coating thickness C and the first absorber layer 22 thickness define an overall thickness O of the acoustic insulator mat 20. By way of example and without limitation, the overall thickness O of the acoustic insulator mat 20 may range from 5.0 to 50 millimeters (mm). Accordingly, the coating 56 contributes little to the overall thickness O of the acoustic insulator mat 20. By way of example and without limitation, the coating weight may range from 75 to 5,000 grams per square meter (g/m$^2$). More particularly, testing has shown that in many automotive applications the coating weight should optimally fall within the range of 150 to 500 grams per square meter (g/m$^2$). At higher coating weights, such as at 500 grams per square meter (g/m$^2$) for example, the coating 56 blocks much of the sound entering the first absorber layer 22 from the wall 38 of the vehicle 40 such that the first absorber layer 22 acts as a decoupler between the wall 38 of the vehicle 40 and the coating 56.

The coating 56 itself is made of a latex material 57 that contains calcium carbonate and a polymer (see FIG. 5). In some embodiments, the latex material 57 of the coating 56 may be mixed such that the latex material 57 is two parts calcium carbonate to one part polymer. Although the polymer in the latex material 57 may be any polymer or a mixture of several polymers, by way of example and without limitation, the polymer may be acrylic. The coating 56 is applied to the second side 32 of the first absorber layer 22 as a liquid spray. The coating 56 has a pre-application composition that is a mixture containing water, calcium carbonate, and polymer. It should be appreciated that the term "pre-application composition", as used herein refers to the composition of the coating 56 before the coating 56 is applied to the first absorber layer 22. It should also be understood that the word "contains" is open-ended and the latex material 57 and the pre-application composition may include other ingredients besides those listed herein. In some embodiments, the water in the pre-application composition of the coating 56 comprises 20 to 30 percent of the mixture by volume. As such, the calcium carbonate and the polymer in such pre-application compositions comprises 70 to 80 percent of the mixture by volume. As will be explained in greater detail below, the water in the pre-application composition may be cooked/flashed off (i.e. evaporated during heating) as the coating 56 cures.

The noise insulating characteristics of the acoustic insulator mat 20 are best understood with reference to FIG. 3. When utilized to reduce noise in the passenger compartment 44 of the vehicle 40, the acoustic insulator mat 20 blocks more incoming noise in comparison to un-coated shoddy mats and has improved sound absorption in comparison to shoddy mats that have a sound barrier film. Noise typically enters the passenger compartment 44 of the vehicle 40 by transmission through the wall 38. By way of example and without limitation, the noise entering the passenger compartment 44 may be produced from wind buffeting, the rotation of the tires (sometimes referred to as road noise), and operation of the engine. As shown in FIG. 5, noise passing through the wall 38 of the vehicle 40 (illustrated by arrow S1) first encounters the first absorber layer 22, since the first absorber layer 22 is disposed between the wall 38 of the vehicle 40 and the coating 56 when the acoustic insulator mat 20 is installed in the vehicle 40. The non-woven fibrous material 24 absorbs some of this noise, but the first absorber layer 22 itself does not block any noise from passing into the passenger compartment 44. However, the partial noise barrier 60 that is formed by the coating 56 does block some of sound traveling from the wall 38 of the vehicle 40 and through the acoustic insulator mat 20 such that this sound is stopped at the coating 56 and does not pass into the passenger compartment 44 (again illustrated by arrow S1). At the same time, the plurality of discontinuities 58 in the coating 56 allow for sound to pass from the passenger compartment 44, through the partial noise barrier 60 formed by the coating 56, and into the first absorber layer 22 where it is absorbed and/or attenuated (as illustrated by arrow S2). Without the plurality of discontinuities 58, the coating 56 would simply reflect the sound illustrated by arrow S2 back into the passenger compartment 44. In this way, the acoustic insulator mat 20 reduces the amount of sound that enters passenger compartment 44 (illustrated by arrow S3) and helps to quiet noise that is already in the passenger compartment 44 (illustrated by arrow S1).

Still referring to FIG. 5, the plurality of discontinuities 58 in the coating 56 also reduces the effects of resonance in comparison to shoddy mats that have a sound barrier film. Because the plurality of discontinuities 58 in the coating 56 allow for a limited amount of sound to escape and pass into the passenger compartment 44 of the vehicle 40, sound is less prone to resonating between the wall 38 of the vehicle 40 and the coating 56 illustrated by arrow S3. Following arrow S3, a path is traced where the sound first passes through the wall 38 of the vehicle 40 and into the first absorber layer 22. The sound then may be deflected back and forth within the first absorber layer 22 between the coating 56 and the wall 38 of the vehicle 40. Because the non-woven fibrous material 24 of the first absorber layer 22 absorbs sound, some of the sound designated by arrow S3 is attenuated by the first absorber layer 22. Eventually, the sound escapes through one of the plurality of discontinuities 58 in the coating 56 disposed on the second side 32 of the first absorber layer 22 and from there travels into the passenger compartment 44 at substantially quieter noise levels. By contrast, sound barrier films (unless the sound barrier films are perforated through additional processing steps) do not have discontinuities through which sound can pass. As a result, sound remains trapped between the sound barrier film and the wall 38 of the vehicle 40. At certain frequencies depending on the thickness of the shoddy layer, sound resonates between the wall 38 and the sound barrier film and can result in poor acoustic performance within the resonant frequency range. For example, resonance may occur in a 175 to 400 hertz (Hz) range when the sound barrier film is affixed to a shoddy layer having a thickness of 22 to 35 millimeters (mm). By varying the coating weight, the disclosed acoustic insulator mat 20 can be tuned so that the resonant frequency is moved to an acceptable frequency range (i.e. to sound frequencies not normally generated by the noise source 42 or found within the passenger compartment 44) or may be tuned so that resonance is eliminated altogether.

Many variations of the coating 56 forming the partial noise barrier 60 are possible and are considered to be within the scope of the subject disclosure. By way of example and without limitation, the coating 56 may be co-extensive with the second side 32 of the first absorber layer 22 as shown in FIG. 1. In other words, the coating 56 may cover (i.e. may be sprayed across) the entire second side 32 of the first absorber layer 22. Alternatively, the coating 56 may extend across only portions of the second side 32 of the first absorber layer 22 as shown in FIG. 6. In this configuration, the second side 32 of the first absorber layer 22 includes at least one un-coated area 62 and one or more coated areas 64. As such, the coated area(s) 64 have increased noise attenuation characteristics in comparison to the un-coated area(s) 62 of the first absorber layer 22. As shown in FIGS. 4 and 5, the thickness of the coating 56 disposed on the second side 32 of the first absorber layer 22 (i.e. the coating thickness C) may be substantially uniform across the second side 32 of the first absorber layer 22. In other words, the coating 56 is substantially homogeneous in FIGS. 4 and 5. The term "substantially uniform" as used herein with respect to the coating thickness C means that the coating 56 has a coating weight that is substantially uniform (i.e. does not vary more than 10%) across the second side 32 of the first absorber layer 22. Alternatively, the thickness of the coating 56 (i.e. the coating thickness C) may vary across the second side 32 of the first absorber layer 22 as shown in FIG. 7. In accordance with this configuration, the coating weight is variable (i.e. varies more than 10%) across the second side 32 of the first absorber layer 22. As shown in FIG. 8, in yet another configuration, the coating 56 may be adhered to fibers of the non-woven fibrous material 24 along the perimeter edge 50 of the first absorber layer 22 and/or along the pass-through opening 52. This may be done to reduce flanking noise transmission through the perimeter edge 50 and the pass-through opening 52 of the first absorber layer 22. It should be appreciated that this is possible because the coating 56 is applied after the first absorber layer 22 has been cut and/or molded into its final shape and after the pass-through opening 52 has been cut into the first absorber layer 22. Also, because the coating 56 is applied after the first absorber layer 22 has been molded, the coating 56 has a substantially uniform coating thickness C over the molded-in contours 46 of the first absorber layer 22. By contrast, if the coating 56 was applied before molding took place, the coating 56 would be drawn out over the molded-in contours 46 resulting in a variable coating thickness C over the molded-in contours 46, which could negatively impact acoustic performance. Further still, the coating 56 may optionally be applied to the first side 30 of the first absorber layer 22 such that both sides 30, 32 of the first absorber layer 22 are covered by the coating 56 (not shown).

Figure 9:
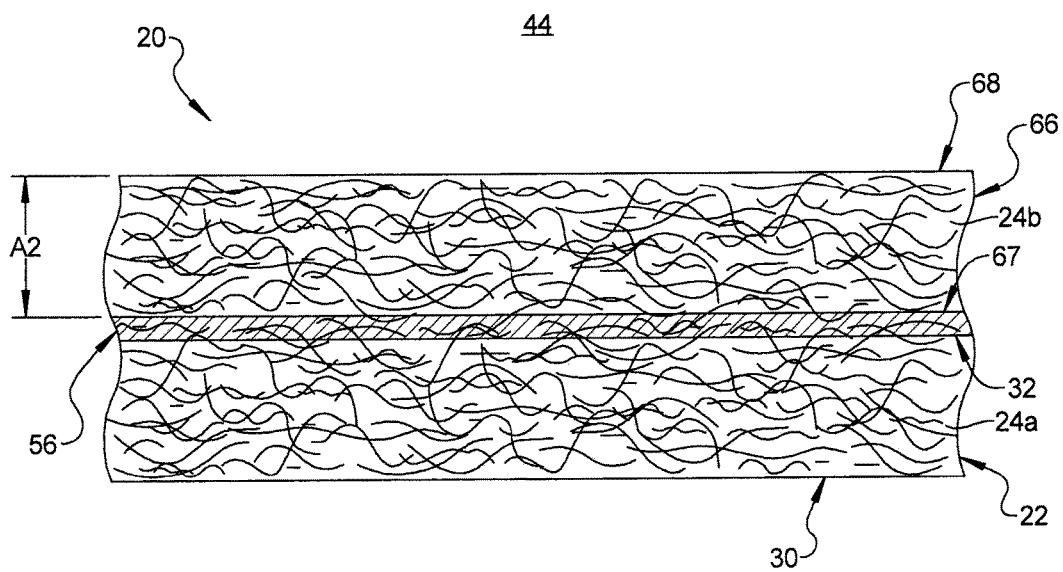
FIG. 9 is a partial cross-sectional view of another exemplary acoustic insulator mat where the coating retains a second absorber layer on the first absorber layer such that the coating is disposed between the first absorber layer and the second absorber layer.

With reference to FIG. 9, another variation is illustrated where the acoustic insulator mat 20 includes a second absorber layer 66. The second absorber layer 66 is made of a non-woven fibrous material 24b that may be the same as or different from the non-woven fibrous material 24a of the first absorber layer 22. By way of example and without limitation, the second absorber layer 66 may be made of microfibers, micro denier rider, polypropylene (PP), polyethylene terephthalate (PET), and/or a combination of these materials. The second absorber layer 66 is disposed on the second side 32 of the first absorber layer 22 such that the coating 56 is positioned between the first absorber layer 22 and the second absorber layer 66. The second absorber layer 66 includes a first surface 67 that faces the first absorber layer 22 and a second surface 68 that faces away from the first absorber layer 22. The second surface 68 of the second absorber layer 66 is spaced from the first surface 67 of the second absorber layer 66 by a second absorber layer thickness A2. By way of example and without limitation, the second absorber layer thickness A2 can range from approximately 5 to 25 millimeters (mm), and can vary over the extent of the second absorber layer 66 to accommodate compression due to local space restrictions, such as ventilation system ducting, electrical cableways, and the like. Notwithstanding, the second absorber layer 66 need not be flat or of uniform thickness and the first surface 67 of the second absorber layer 66 may or may not be parallel to the second surface 68 of the second absorber layer 66. The coating 56 is adhered to the second side 32 of the first absorber layer 22 and the first surface 67 of the second absorber layer 66 such that the coating 56 retains the second absorber layer 66 on the first absorber layer 22. Advantageously, the second absorber layer 66 provides additional noise absorption for sound contained within the passenger compartment 44 since the second absorber layer 66 is made of a sound absorbent material. The second absorber layer 66 also attenuates noise passing from first absorber layer 22 through the plurality of discontinuities 58 in the coating 56, since this sound has to travel through the second absorber layer 66 before reaching the passenger compartment 44.

Figure 10:
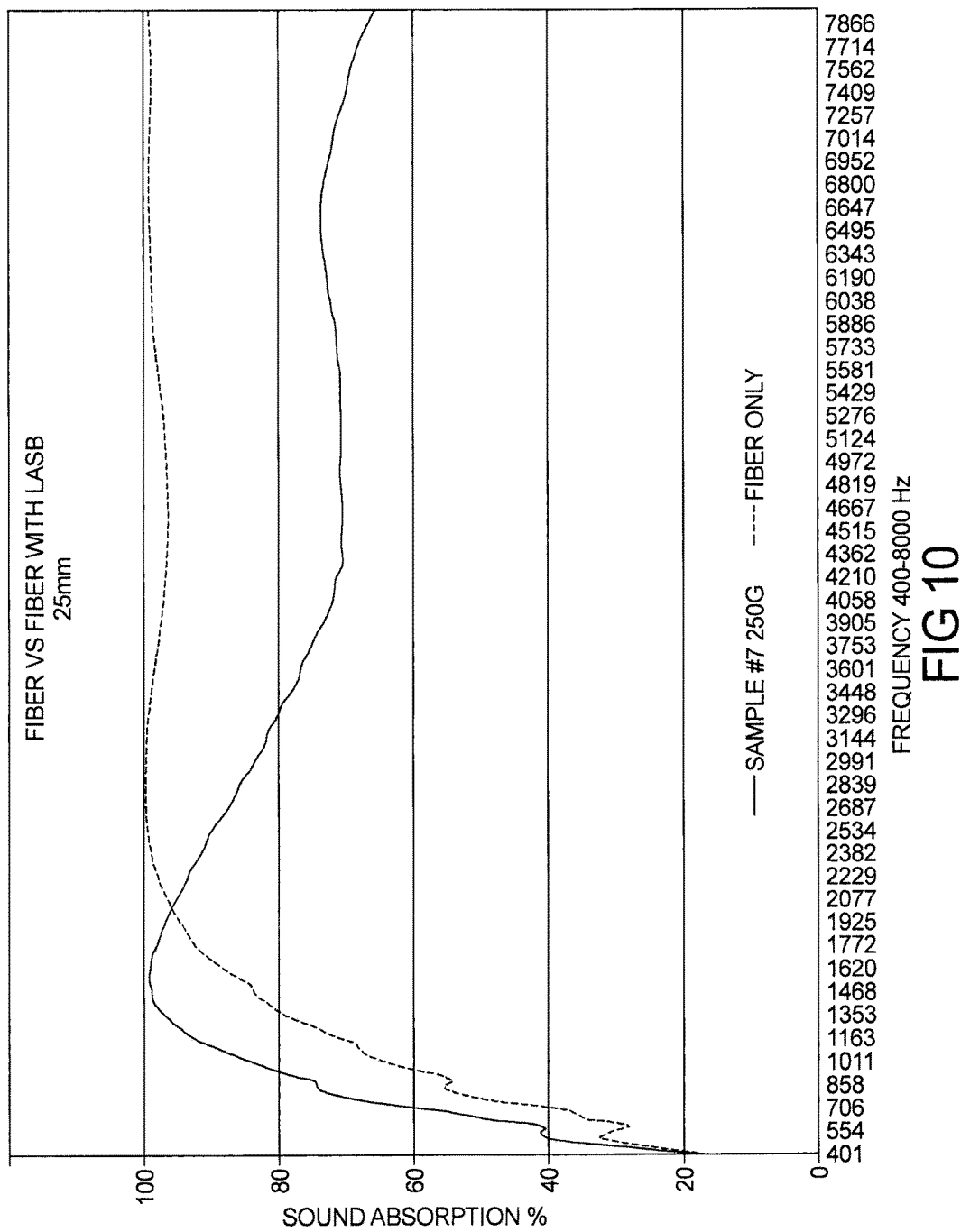
FIG. 10 is a plot of sound absorption percentage versus frequency that compares the acoustic absorption performance of a sample of an un-coated shoddy mat and a sample of an exemplary acoustic insulator mat constructed in accordance with the subject disclosure.

Referring to FIG. 10, test data is illustrated comparing the acoustic performance of one sample of the acoustic insulator mat 20 of the present disclosure to a sample of an un-coated shoddy mat. The test data is presented in a plot with an x-axis (horizontal) and a y-axis (vertical). The y-axis in FIG.

10 corresponds to a sound absorption percentage ranging from 0 to 100 percent and the x-axis corresponds to a sound frequency ranging between approximately 400 and 8,000 hertz (Hz). The sample labeled "Sample #7 250 G" is a sample of the acoustic insulator mat 20 of the subject disclosure having an overall thickness O of 25 millimeters (mm) and a coating weight of 250 grams per square meter (g/m$^2$). The sample labeled "Fiber Only" is a sample of un-coated shoddy mat also having a thickness of 25 millimeters (mm). The test data indicates that the sample of the acoustic insulator mat 20 of the present disclosure has a lower sound absorption percentage when compared to the sample of un-coated shoddy mat, but has a higher absorption percentage at the lower frequencies which are normally very difficult to absorb. Specifically, the sample of the acoustic insulator mat 20 of the present disclosure has a sound absorption percentage ranging from approximately 60 to 85 percent across the majority of the tested frequency range. By contrast, the sample of un-coated shoddy mat has a sound absorption percentage ranging from approximately 95 to 100 percent across the majority of the tested frequency range. Composite materials that are highly sound absorbent (i.e. that have a sound absorption percentage near 100%) typically exhibit poor transmission loss (i.e. they do not block sound well). The opposite is also true. Composite materials that exhibit high transmission loss (i.e. that block a lot of sound) are typically not very noise absorbent (i.e. they have a low sound absorption percentage). The 60 to 85 percent range of the acoustic insulator mat 20 of the present disclosure is considered to be an optimal balance between noise absorption and noise transmission loss (i.e. the amount of sound that is blocked by the material). Accordingly, the test data shown in FIG. 10 indicates that un-coated shoddy mat is highly sound absorbent and thus functions to quiet noise within the passenger compartment 44, but does not block noise from entering the passenger compartment 44. The test data shown in FIG. 10 also indicates that the disclosed acoustic insulator mat 20 has an optimal balance of sound absorbance and transmission loss such that the acoustic insulator mat 20 functions to quiet noise within the passenger compartment 44 and block noise from entering the passenger compartment 44.

Figure 11:
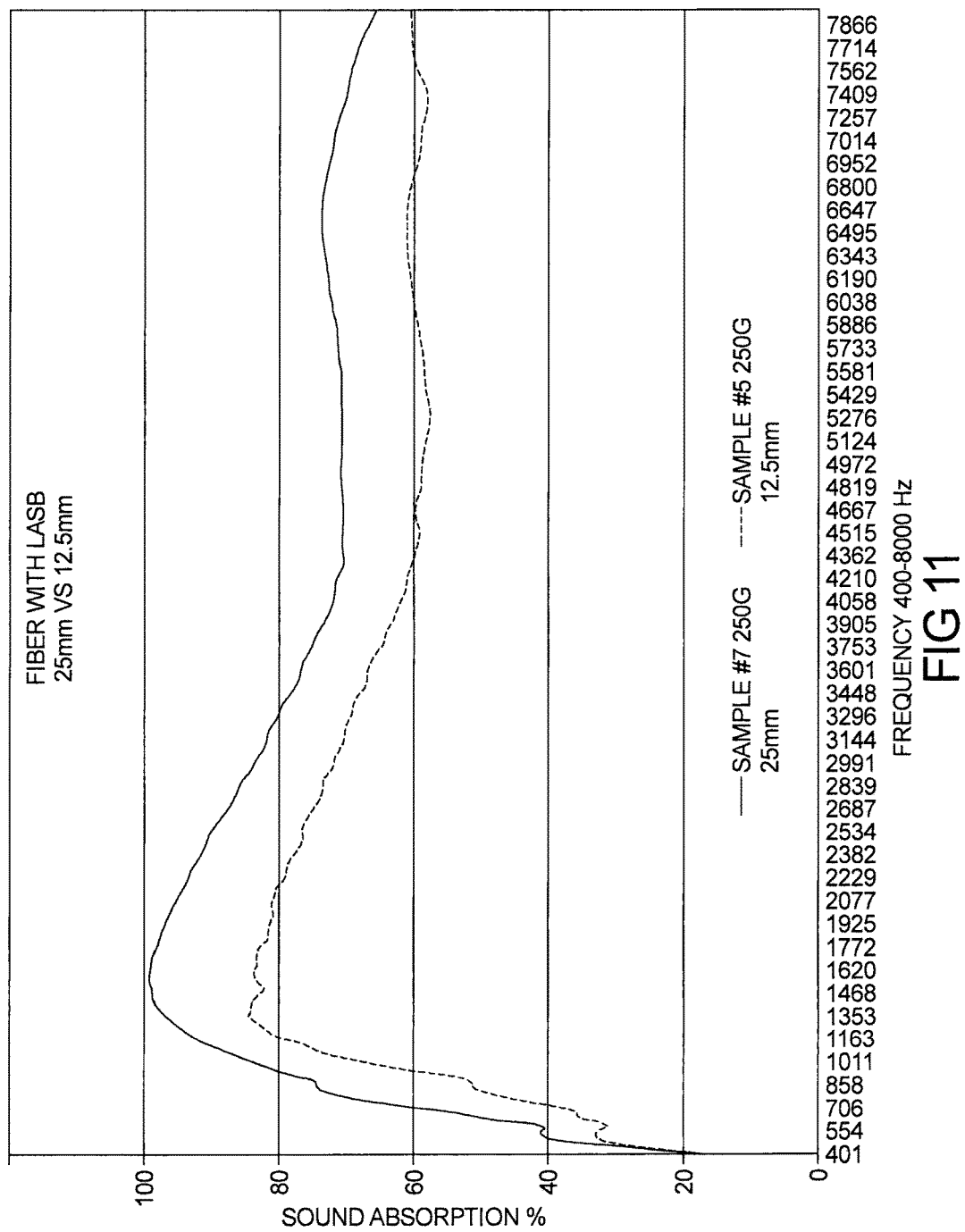
FIG. 11 is a plot of sound absorption percentage versus frequency that compares the acoustic absorption performance of two different samples of the disclosed acoustic insulator mat at different thicknesses.

Referring to FIG. 11, test data is illustrated comparing the acoustic performance of two different samples of the acoustic insulator mat 20 of the present disclosure. The test data is presented in a plot with an x-axis (horizontal) and a y-axis (vertical). The y-axis in FIG. 11 corresponds to a sound absorption percentage ranging from 0 to 100 percent and the x-axis corresponds to a sound frequency ranging between approximately 400 and 8,000 hertz (Hz). The sample labeled "Sample #7 250 G" is a sample of the acoustic insulator mat 20 of the subject disclosure having an overall thickness O of 25 millimeters (mm) and a coating weight of 250 grams per square meter (g/m$^2$). The sample labeled "Sample #5 250 G" is a sample of the acoustic insulator mat 20 of the subject disclosure having an overall thickness O of 12.5 millimeters (mm) and a coating weight of 250 grams per square meter (g/m$^2$). The test data indicates that the sample of the acoustic insulator mat 20 that has an overall thickness O of 25 millimeters (mm) (i.e. Sample #7 250 G) has a higher sound absorption percentage when compared to the sample of the acoustic insulator mat 20 that has an overall thickness O of 12.5 millimeters (mm) (i.e. Sample #5 250 G). Accordingly, the test data shown in FIG. 11 indicates that the sound absorbance of the acoustic insulator mat 20 decreases as the overall thickness O of the acoustic insulator mat 20 decreases. Because the coating 56 contributes little to the overall thickness O of the acoustic insulator mat 20 and since same coating weight of 250 grams per square meter (g/m$^2$) was used for both samples, the test data indicates that the sound absorbance of the acoustic insulator mat 20 depends upon and decreases with the first absorber layer thickness A1. The test data also shows that the sound absorption percentage of both samples of the acoustic insulator mat 20 peaks around 1,500 hertz (Hz). Thus, different first absorber layer thicknesses A1 may be chosen to tune the acoustic insulator mat 20 to a specific balance of sound absorbance and transmission loss at specific frequency ranges, if desired, such that the acoustic performance of the acoustic insulator mat 20 is optimized in those target frequency ranges. In this way, the acoustic insulator mat 20 can be constructed with the goal of reducing noise at certain frequency ranges.

Referring to FIG. 12, test data is illustrated comparing the acoustic performance of four different samples of the acoustic insulator mat 20 of the present disclosure. The test data is presented in a plot with an x-axis (horizontal) and a y-axis (vertical). The y-axis in FIG. 12 corresponds to a sound absorption percentage ranging from 0 to 100 percent and the x-axis corresponds to a sound frequency ranging between approximately 400 and 8,000 hertz (Hz). The sample labeled "Sample #4 150 G" is a sample of the acoustic insulator mat 20 of the subject disclosure having an overall thickness O of 25 millimeters (mm) and a coating weight of 150 grams per square meter (g/m$^2$). The sample labeled "Sample #7 250 G" is a sample of the acoustic insulator mat 20 of the subject disclosure having an overall thickness O of 25 millimeters (mm) and a coating weight of 250 grams per square meter (g/m$^2$). The sample labeled "Sample #12 500 G" is a sample of the acoustic insulator mat 20 of the subject disclosure having an overall thickness O of 25 millimeters (mm) and a coating weight of 500 grams per square meter (g/m$^2$). The sample labeled "Sample #16 750 G" is a sample of the acoustic insulator mat 20 of the subject disclosure having an overall thickness O of 25 millimeters (mm) and a coating weight of 750 grams per square meter (g/m$^2$). The test data indicates that the sample of the acoustic insulator mat 20 that has a coating weight of 150 grams per square meter (g/m$^2$) (i.e. Sample #4 150 G) has a higher sound absorption percentage when compared to the sample of the acoustic insulator mat 20 that has a coating weight of 250 grams per square meter (g/m$^2$) (i.e. Sample #7 250 G). This trend continues where the sound absorbance of the acoustic insulator mat 20 decreases as the coating weight of the acoustic insulator mat 20 increases. The test data also shows that the sound absorption percentage of the samples of the acoustic insulator mat 20 peaks at a frequency below 1,500 hertz (Hz). Thus, different coating weights may be chosen to tune the acoustic insulator mat 20 to a specific balance of sound absorbance and transmission loss at specific frequency ranges, if desired, such that the acoustic performance of the acoustic insulator mat 20 is optimized in those target frequency ranges. In this way, the acoustic insulator mat 20 can be constructed with the goal of reducing of noise at certain frequency ranges.

Figure 14:
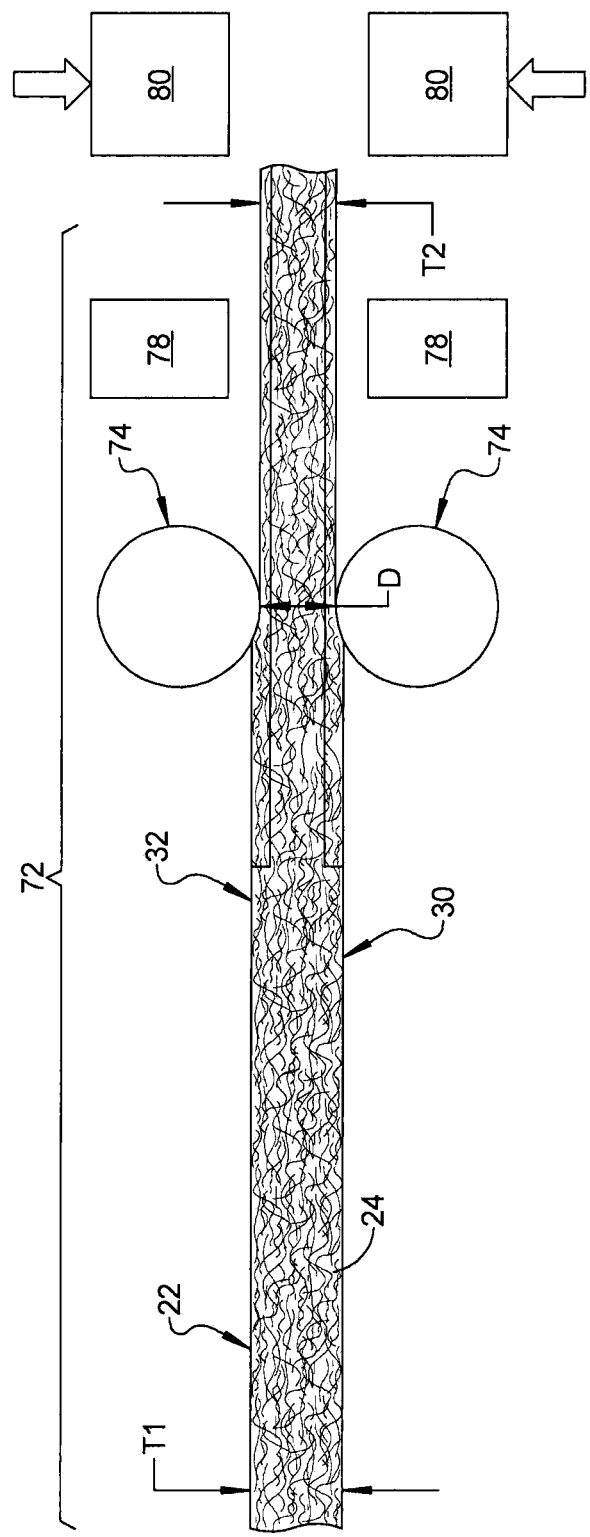
FIG. 14 is a side elevation view of the first absorber layer being compressed by a pair of rollers and passed into a press for molding in accordance with the compressing and molding steps of the method illustrated in FIG. 13.

A method of manufacturing the acoustic insulator mat 20 described above is also disclosed. As shown by the flow chart labeled as FIG. 13, the method includes a number of steps. The method includes the step illustrated by block 100 of making a first absorber layer 22 out of a non-woven fibrous material 24 and a binder bi-component. The binder bi-component holds the mesh of intertwined fibers 26 in the non-woven fibrous material 24 together such that the first absorber layer 22 forms a sheet 72. Accordingly, the first absorber layer 22 has a first side 30 and a second side 32 that is spaced from the first side 30 by a first thickness T1 (shown in FIG. 14). The method may include the step illustrated by block 102 of compressing the first absorber layer 22 to a second thickness T2 (shown in FIG. 14) that is smaller than the first thickness T1. The step set forth in block 102 is further illustrated in FIG. 14, which shows the sheet 72 forming the first absorber layer 22 being feed through a pair of rollers 74 that are spaced apart by a distance D that is smaller than the first thickness T1 of the sheet 72 forming the first absorber layer 22. It should be appreciated that the sheet 72 forming the first absorber layer 22 illustrated in FIG. 14 is feed from the left to the right. The method may also include the step illustrated by block 104 of heating the first absorber layer 22 after the step of block 102. By way of example and without limitation, the heating step of block 104 may include heating the first absorber layer 22 to a temperature of 350 degrees Fahrenheit. As shown in FIG. 14, this may include, without limitation, placing or feeding the first absorber layer 22 into or past a heat source 78 such as a convection oven, a microwave oven, an induction oven, or an infrared oven. In accordance with the heating step of block 104, the heat activates the binder by-component in the first absorber layer 22 and flattens at least the second side 32 of the first absorber layer 22.

The method may include the step illustrated in block 106 of FIG. 13, where the sheet 72 forming the first absorber layer 22 is molded into a pre-determined shape 76. As illustrated in FIG. 3, the pre-determined shape 76 of the acoustic insulator mat 20 may be contoured to mate with the wall 38 of the vehicle 40 such that the first absorber layer 22 is not planar and/or has a variable thickness after the step listed in block 106. FIG. 14 also shows the sheet 72 forming the first absorber layer 22 being feed into a press 80. The press 80 closes on the sheet 72 forming the first absorber layer 22 after the sheet 72 has passed through the pair of rollers 74 and has been heated by the heat source 78. When the press 80 closes, the first absorber layer 22 is molded into the pre-determined shape 76 (shown in FIG. 3).

The method may also include the step illustrated by block 108 of FIG. 13, where the first absorber layer 22 is cut to create one or more pass-through openings 52 (shown in FIG. 1) that extend(s) entirely through the first absorber layer 22 between the first side 30 and the second side 32. The pass-through openings 52 may be sized and shaped to receive the penetrating member 54 of the vehicle 40 (shown in FIG. 3). It should be appreciated that the step set forth in block 108 of FIG. 13 may be performed by a die cutting operation and may be performed concurrently with the step set forth in block 106, where the press 80 molds the first absorber layer 22 and cuts the pass-through openings 52 as the press 80 closes on the sheet 72.

Figure 15:
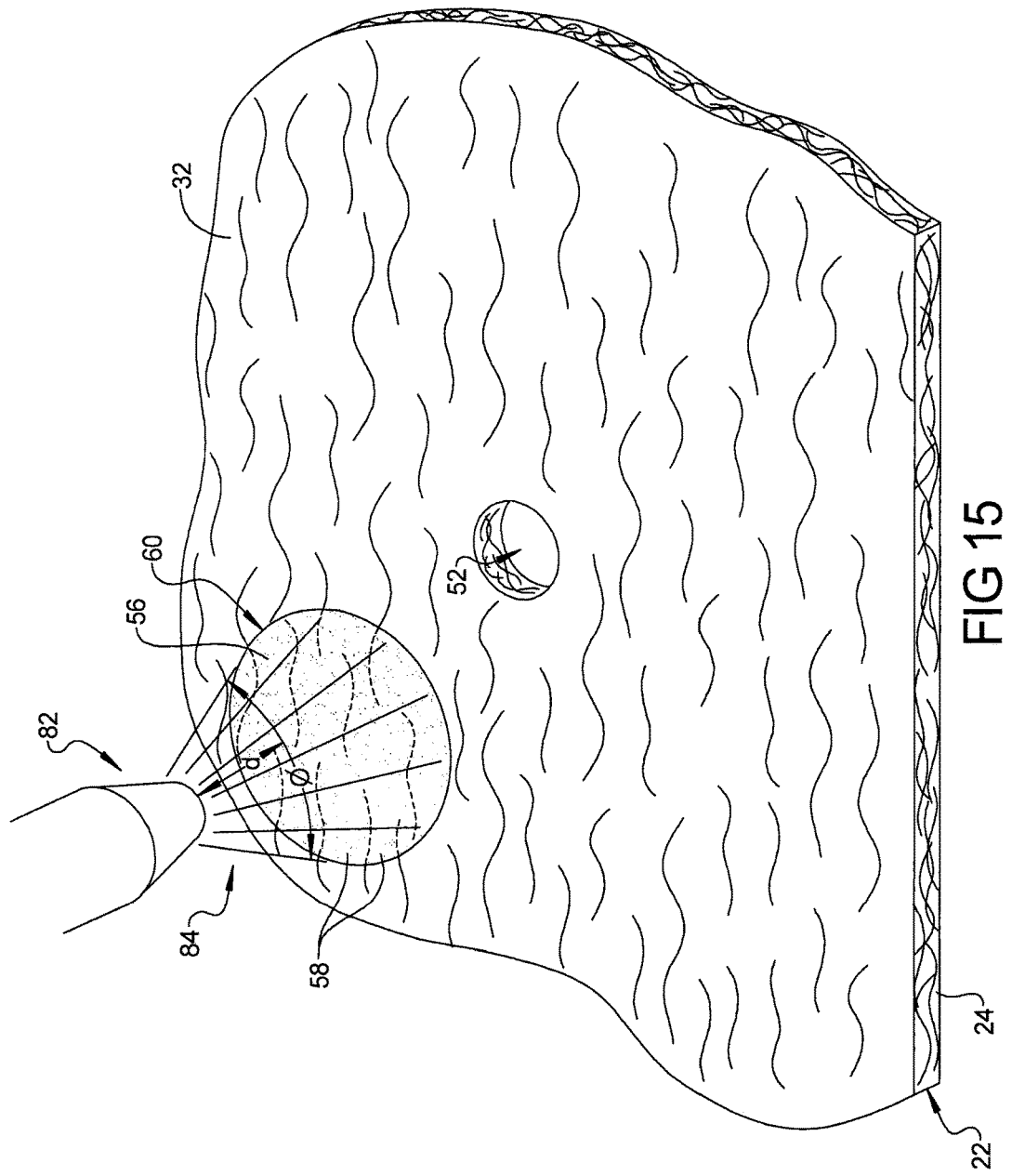
FIG. 15 is a partial, front perspective view of the first absorber layer being sprayed with the coating in accordance with the spraying step of the method illustrated in FIG. 13.

The method further includes the step illustrated by block 110 of spraying a mixture of water, calcium carbonate, and polymer onto the second side 32 of the first absorber layer 22. The spraying step of block 110 is performed after the molding step of block 106 and/or after the cutting step of block 108. This order of steps 106, 108, and 110 allows for a substantial uniform coating thickness C over the molded-in contours 46 and the application of the coating 56 along the perimeter edge 50 and/or the pass-through opening(s) 52 of the first absorber layer 22. The spraying step of block 110 is further illustrated in FIG. 15, showing a spray head 82 positioned above the second side 32 of the first absorber layer 22. A spray 84 of the mixture of water, calcium carbonate, and polymer is emitted from the spray head 82. The spray 84 is directed at the second side 32 of the first absorber layer 22 such that the spray 84 coats the second side 32 of the first absorber layer 22. This creates a partial noise barrier 60 on the second side 32 of the first absorber layer 22, where the second side 32 of the first absorber layer 22 has a plurality of discontinuities 58 that permit the passage of sound. The spraying step set forth in block 110 of FIG. 13 may include coating the second side 32 of the first absorber layer 22 with the mixture of water, calcium carbonate, and polymer until a coating weight of 75 to 5,000 grams per square meter is achieved. More particularly, the spraying step set forth in block 110 of FIG. 13 may include coating the second side 32 of the first absorber layer 22 with the mixture of water, calcium carbonate, and polymer until a coating weight of 150 to 500 grams per square meter is achieved. With reference to FIG. 15, various coating weights may be achieved by moving the spray head 82 over the second side 32 of the first absorber layer 22 in a series of passes such that the coating 56 builds up with each pass. Alternatively, the coating weight may be varied by adjusting various parameters, including without limitation, volume flow rate of the spray, divergence angle Ø of the spray, distance d between the spray head 82 and the second side 32 of the first absorber layer 22, and/or dwell time of the spray head 82 (i.e. how long the spray head 82 stays positioned over one location). Further, it should be appreciated that the spray head 82 may be moved over only portions of the second side 32 of the first absorber layer 22 such that areas of the first absorber layer 22 remain un-coated.

The method may also include the step illustrated by block 112 of heating or re-heating the first absorber layer 22 after the spraying step of block 110 to flash off the water in the mixture and cure the partial noise barrier 60. This may include, without limitation, placing or feeding the coated first absorber layer 22 into or past the same heat source 80 used for the step of block 104 or another heat source (not shown), which may be, without limitation, a convection oven, microwave oven, induction oven, or infrared oven. Optionally, the method may include the step illustrated by block 114 of making a second absorber layer 66 out of a non-woven fibrous material 24b and a binder bi-component. The non-woven fibrous material 24b and the binder bi-component of the second absorber layer 66 may or may not be the same and the non-woven fibrous material 24a and the binder bi-component of the first absorber layer 22. Like in the first absorber layer 22, the binder bi-component of the second absorber layer 66 functions to hold the non-woven fibrous material 24b of the second absorber layer 66 together. The method may also include the step illustrated by block 116 of pressing the second absorber layer 66 against the partial noise barrier 60 on the second side 32 of the first absorber layer 22 to adhere the second absorber layer 66 to the first absorber layer 22. In this way, the partial noise barrier 60 is sandwiched between the first absorber layer 22 and the second absorber layer 66 and retains the second absorber layer 66 on the first absorber layer 22.

Figure 16:
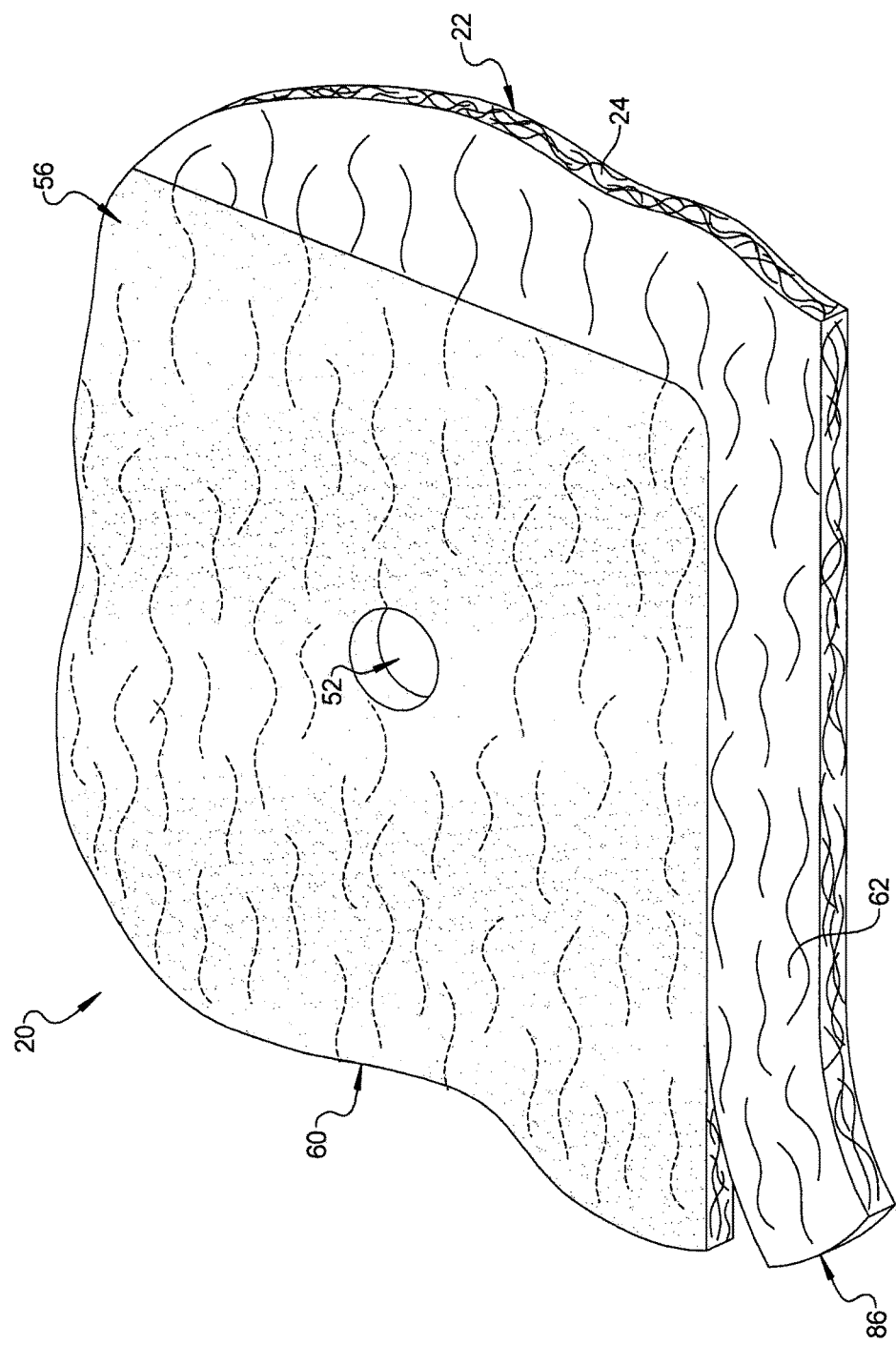
FIG. 16 is a partial, front perspective view of the first absorber layer where the un-coated areas of the first absorber layer are being trimmed off in accordance with the trimming step of the method illustrated in FIG. 13.

Optionally, the method may also include the step illustrated by block 118 of trimming off any excess from the first absorber layer 22 and/or the second absorber layer 66 that does not overlap with the partial noise barrier 60. The trimming step of block 118 is further illustrated in FIG. 16. In accordance with the spraying step of block 110 and the trimming step of block 118, peripheral portions of the first absorber layer 22 may include un-coated areas 62. Such un-coated areas 62 of the first absorber layer 22 and adjacent areas of the second absorber layer 66, which are held to the first absorber layer 22 by the partial noise barrier 60, become offal 86 when they are trimmed from the acoustic insulator mat 20. The offal 86 is scrap that is free of the mixture of water, calcium carbonate, and polymer (i.e. free of the partial noise barrier 60). It should be appreciated that the offal 86 may be trimmed from the acoustic insulator mat 20 using various machinery, including without limitation, saws, shears, blades, or a water jet. In order to re-use this scrap material, the method may additionally include the step illustrated by block 120 of FIG. 13, where the offal 86 is recycled. Advantageously, because the offal 86 from the first absorber layer 22 and/or the second absorber layer 66 is free of the mixture of water, calcium carbonate, and polymer, it may be chopped and re-used to make another sheet of non-woven fibrous material 24. This recycled sheet of non-woven fibrous material may be used as the first absorber layer and/or the second absorber layer in another, subsequently manufactured acoustic insulator mat. Therefore, less waste (i.e. scrap) is generated by the method of manufacture described herein when the recycling step illustrated by block 120 of FIG. 13 is performed.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the appended apparatus claims refers to an antecedent that is a positive recitation meant to be included in the coverage of the claims whereas the word "the" precedes a word not meant to be included in the coverage of the claims. The method described herein and illustrated in FIG. 13 is presented for the purpose of illustration and disclosure. As evinced by the appended method claims, the method is not necessarily limited to all of the steps described herein and illustrated as blocks 100 through 120 in FIG. 13. Accordingly, the method may be successfully practiced by performing only some of these steps. Additionally, the method is not limited to the order of the steps disclosed herein and illustrated in FIG. 13. The method may be practiced by performing these steps in an alternative order or sequence unless otherwise noted herein.

What is claimed is:

1. An acoustic insulator mat comprising:
   a first absorber layer made of a non-woven fibrous shoddy material that absorbs noise;
   said non-woven fibrous shoddy material comprising a mesh of intertwined fibers that defines a plurality of cavities within said first absorber layer;
   said first absorber layer including a first side and a second side;
   said mesh of intertwined fibers including peripheral fibers that are arranged along said second side of said first absorber layer;
   said plurality of cavities in said first absorber layer including peripheral cavities arranged along said second side of said first absorber layer between said peripheral fibers, said peripheral cavities being open to said second side of said first absorber layer; and
   a coating disposed on said second side of said first absorber layer that is adhered to said peripheral fibers of said first absorber layer and that includes a plurality of discontinuities formed in said coating by said peripheral cavities in said second side of said first absorber layer such that said coating provides a partial barrier to noise at said second side of said first absorber layer.

2. The acoustic insulator mat as set forth in claim 1 wherein said plurality of discontinuities vary in size, shape, and spacing across said coating.

3. The acoustic insulator mat as set forth in claim 1 wherein said coating is made of a latex material that contains calcium carbonate and a polymer.

4. The acoustic insulator mat as set forth in claim 3 wherein said latex material of said coating is made of two parts calcium carbonate to one part polymer.

5. The acoustic insulator mat as set forth in claim 1 wherein said coating has a pre-application composition that is a mixture containing water, calcium carbonate, and polymer.

6. The acoustic insulator mat as set forth in claim 5 wherein said water in said pre-application composition of said coating comprises 20 percent to 30 percent of said mixture by volume.

7. The acoustic insulator mat as set forth in claim 1 wherein said coating is co-extensive with said second side of said first absorber layer.

8. The acoustic insulator mat as set forth in claim 1 wherein said coating extends across only portions of said second side of said first absorber layer to provide areas of increased noise attenuation.

9. The acoustic insulator mat as set forth in claim 1 wherein said coating has a coating weight that is substantially uniform across said second side of said first absorber layer such that said coating has a substantially uniform thickness across said second side of said first absorber layer.

10. The acoustic insulator mat as set forth in claim 9 wherein said coating weight is 75 to 5,000 grams per square meter.

11. The acoustic insulator mat as set forth in claim 9 wherein said coating weight is 150 to 500 grams per square meter.

12. The acoustic insulator mat as set forth in claim 1 wherein said coating has a coating weight that varies across said second side of said first absorber layer such that said coating has a variable thickness across said second side of said first absorber layer.

13. The acoustic insulator mat as set forth in claim 1 wherein said first absorber layer has a perimeter edge that extends between said first side and said second side of said first absorber layer and wherein said coating is adhered to fibers of said non-woven fibrous shoddy material along said perimeter edge of said first absorber layer to reduce flanking noise transmission through said perimeter edge.

14. The acoustic insulator mat as set forth in claim 1 wherein said first absorber layer has a pass-through opening that extends through said non-woven fibrous shoddy material of said first absorber layer from said first side to said second side and wherein said coating is adhered to fibers of said non-woven fibrous shoddy material along said pass-through opening to reduce flanking noise transmission through said pass-through opening.

15. The acoustic insulator mat as set forth in claim 1 further comprising:
   a second absorber layer made of a non-woven fibrous material that is disposed on said second side of said first absorber layer such that said coating is positioned between said first absorber layer and said second absorber layer, said second absorber layer including a first surface facing said first absorber layer and a second surface facing away from said first absorber layer, said coating being adhered to said second side of said first absorber layer and said first surface of said second absorber layer such that said coating retains said second absorber layer on said first absorber layer.

* * * * *